United States Patent

Grill et al.

[11] 3,980,753
[45] Sept. 14, 1976

[54] INDUSTRIAL PROCESS OF PREPARING MAGNESIA OF HIGH PURITY

[75] Inventors: Michael Grill; Georg Bouvier, both of Loeben-Goess, Austria

[73] Assignee: Veitscher Magnesitwerke-Aktiengesellschaft, Vienna, Austria

[22] Filed: Nov. 29, 1974

[21] Appl. No.: 528,034

Related U.S. Application Data

[63] Continuation of Ser. No. 112,110, Feb. 3, 1971, abandoned.

[30] Foreign Application Priority Data

Feb. 20, 1970 Austria .............................. 1587/70

[52] U.S. Cl. .............................. 423/161; 423/163; 423/164; 423/166; 423/636; 423/637
[51] Int. Cl.² .............................................. C01F 5/02
[58] Field of Search ........... 423/163, 164, 166, 635, 423/636, 637, 161

[56] References Cited
UNITED STATES PATENTS 2,398,493  4/1946  Butt et al. .................. 423/164 X
2,473,534  6/1949  Lloyd ................................ 423/163
3,567,378  3/1971  Ferris ............................ 423/163 X Primary Examiner—Edward J. Meros
Attorney, Agent, or Firm—Kurt Kelman

[57] ABSTRACT

Magnesia of very high purity is produced industrially from a magnesite waste material wherein impurities are present in such amounts that the weight ratio of the precipitable hydroxide ions, calculated as the sum of $Fe_2O_3 + Al_2O_3 + Cr_2O_3 + Mn_3O_4$ to the sum of $SiO_2 + TiO_2 + B_2O_3$, is at least 1 : 3. The starting material is dissolved in hydrochloric acid of 15–32% concentration, the impurities are precipitated by adjusting the pH of the acidic solution to 4 – 9, and the purified magnesium chloride solution is thermally decomposed into magnesia and hydrochloric acid gas, the latter being recycled to form the hydrochloric acid of the stated concentration for dissolving the starting material.

12 Claims, 1 Drawing Figure

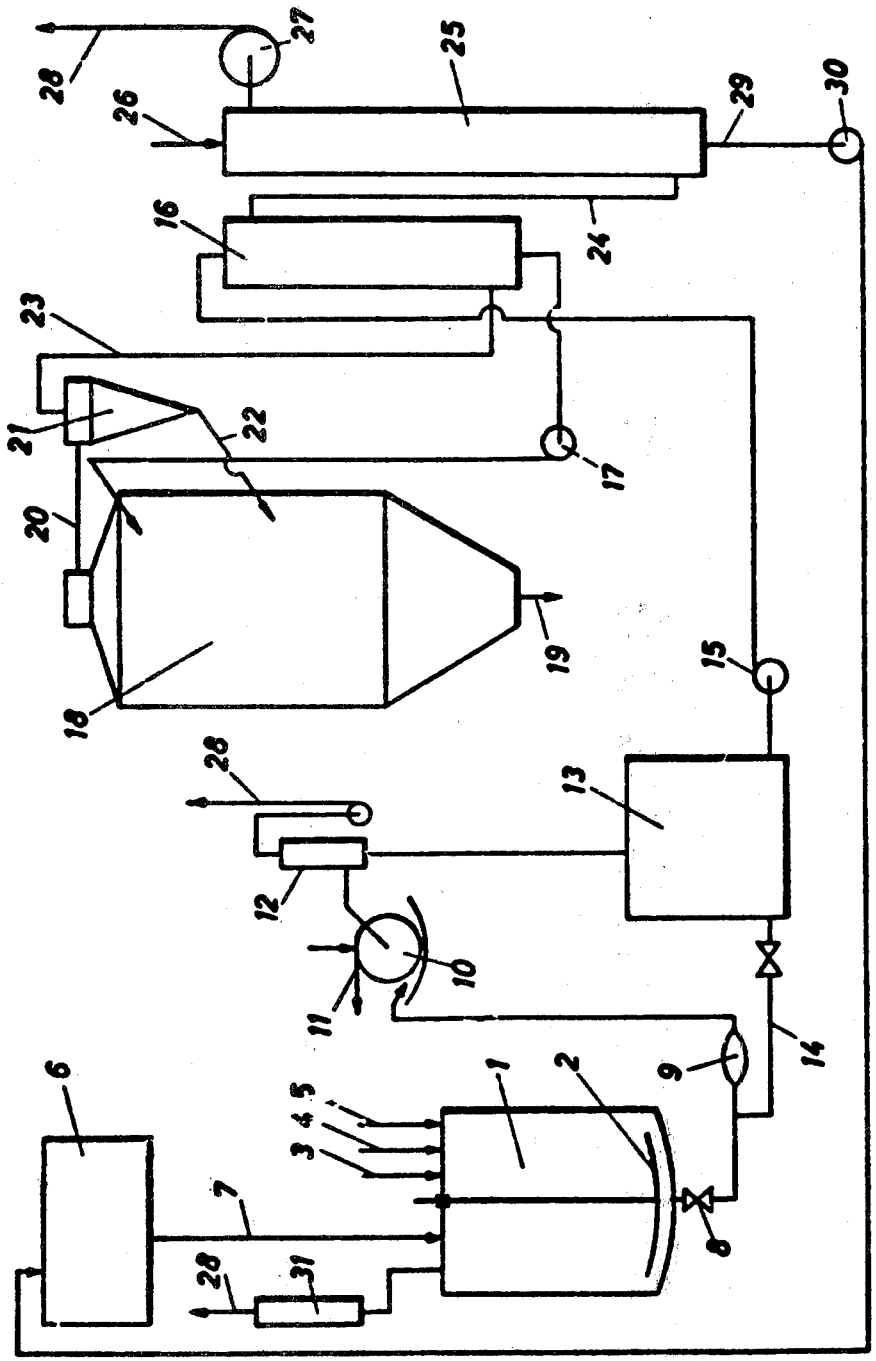

INDUSTRIAL PROCESS OF PREPARING MAGNESIA OF HIGH PURITY

This is a division of application Ser. No. 112,110, filed Feb. 3, 1971, now abandoned.

The present invention relates to an improved industrial process of preparing magnesia of high purity which contains more than 98%, by weight, preferably more than 99%, magnesia.

Magnesia of such high purity has become an important industrial product, for instance in the manufacture of basic refractory bricks used in linings of metallurgical vessels. Very few natural magnesite deposits supply a mineral raw material from which magnesia of such high purity may be readily prepared by known processes. Even magnesite obtained from seawater or brine solutions often contains impurities which impair the quality of the resulting magnesia. For instance, the presence of a mere 0.05%, by weight, of $B_2O_3$ may reduce the refractory qualities of magnesia bricks.

It is accordingly a primary object of this invention to provide an industrially useful process of preparing magnesia of high purity containing more than 98%, preferably more than 99%, by weight, of magnesia and less than 0.1%, preferably less than 0.05%, by weight, of each of the oxides of iron, aluminum, chromium, manganese, silicon, titanium, potassium, sodium and boron, from a magnesium-containing, preferably mineral, starting material which contains impurities.

It has been proposed to dissolve a magnesium-containing starting material, such as magnesite or dolomite, as well as waste materials obtained from the magnesite industry, in concentrated cold hydrochloric acid, to add a magnesium-containing substance to the resultant solution to precipitate impurities, and to remove the precipitated impurities to obtain magnesia. In this known process, particulate magnesium oxide or hydroxide has been used as the precipitant, in which case the resultant heat of reaction aided in dissolving even the components which are not readily soluble. The precipitate included the hydroxides of iron and aluminum as well as silica, and after their removal, sodium carbonate or hydroxide was added to the clear solution to produce magnesium carbonate or hydroxide. Calcining of the latter product produced magnesia. If the starting material also contained calcium, the calcium oxide may be removed by adding sulfuric acid to precipitate the calcium as calcium sulfate. This process of producing magnesia has not been used on an industrial scale because the recovery of the expensive hydrochloric acid was very difficult and, accordingly, involved high costs.

It has also been proposed to recover hydrochloric acid from impure magnesium chloride. For this purpose, the magnesium chloride-containing starting material was atomized in aqueous solution or as a melt and thermally decomposed in the presence of water vapor by hot gases having a temperature of 750°C. to 1100°C. The free hydrochloric acid gas was converted to hydrochloric acid by washing with water or diluted hydrochloric acid. Magnesia containing impurities was obtained as a by-product in this process. The starting material of this known process of obtaining hydrochloric acid is magnesium chloride, and it neither contemplates nor achieves a commercially feasible method of obtaining pure magnesia from a starting material whose major components are magnesium carbonate, magnesium oxide, magnesium hydroxide and mixtures thereof. Were it desired to use this process for making magnesia on an industrial scale, the problem of using or disposing of the large amounts of the hydrochloric acid product of the process would arise.

Hydrochloric acid gas has also been produced by the thermal decomposition of the chloride of iron produced in the pickling of steel, the hydrochloric acid gas being used again in the pickling process in the form of the hydrochloric acid.

According to the invention, magnesia of high purity is produced on an industrial scale and at sufficiently low cost to make it useful for the commercial manufacture of refractories, for instance, from a magnesium-containing material whose major components are magnesium carbonate, magnesium oxide anad magnesium hydroxide but which contains a variety of impurities. For this purpose, use must be made of a starting material wherein impurities are present in such amounts that the weight ratio of the ions precipitable as hydroxides, calculated as the sum of $Fe_2O_3 + Al_2O_3 + Mn_3O_4$ to the sum of $SiO_2 + TiO_2 + B_2O_3$, is at least 1 : 3, preferably more than 1 : 1. This starting material is dissolved in hydrochloric acid having a concentration of 15 to 32%, preferably 18–22%, by weight, at a temperature above about 70°C. to obtain an acidic solution. A magnesium and/or calcium-containing substance is added to the acidic solution to adjust its pH to the range of 4 to 9, preferably 6 – 8 whereby the sesquioxide impurities are precipitated as hydroxides and any other colloidally dissolved or adsorbable impurities ($SiO_2$, $TiO_2$, $B_2O_3$) are taken out of the solution with the hydroxides. The precipitate is separated to leave a purified magnesium chloride solution which is then subjected to the known thermal decomposition, but at a temperature of 400°C. to 900°C., preferably between 550°C. and 750°C., to produce magnesia and hydrochloric acid gas, which gas is used for the hydrochloric acid in the above-indicated concentration to dissolve a succeeding batch of the starting material.

Useful starting materials for the process include iron-rich raw magnesite, such as found in the well known Austrian deposits, caustically burnt impure magnesia, sintered magnesia, as well as waste products and by-products obtained from magnesite converting and manufacturing plants, used magnesia bricks and masses, etc. Native magnesium hydroxide, such as brucite, or hydrated magnesium oxide materials may also be used as starting material. All sorts of mixtures of such materials, as well as dolomite, may also be used. Preferably, the starting material is particulate and has a particle size of less than 3 mm.

As will become clear from the following description of the purification process, commercial usefulness requires that the above-enumerated oxide impurities are present in the starting material in the indicated weight ratio. If the available starting material does not meet this condition, this composition may be obtained by admixing required amounts of the impurities thereto.

The single FIGURE of the accompanying drawing shows, by way of example, an installation useful for carrying out the process of the present invention. In this installation, the starting material may be supplied batch-wise while the produced magnesia may be removed continuously.

Referring now to the drawing, there is shown a reaction vessel 1 to which is supplied a batch of starting material, for instance a magnesite dust, through input line 3. Supplemental input lines 4 and 5 are provided to supply magnesium sulfate hydrate, such as kieserite, and oxidizing agents, such as elemental chlorine, when desired. Storage tank 6 holds concentrated hydrochloric acid, for instance 20% HCl, which is supplied to reaction vessel 1 through inlet pipe 7.

The reaction mixture is stirred in the reaction vessel by agitator 2 to produce an acidic $MgCl_2$ solution. Adding additional magnesite dust or properly metering the supply thereof while simultaneously delivering the acid into the vessel will neutralize the solution and turn it alkaline whereby the impurities, except for CaO, are precipitated as hydroxides or are carried along therewith. The calcium oxide in the starting material is converted to $CaCl_2$ and the latter is slowly precipitated to a large extent as plaster of Paris by the magnesium sulfate hydrate introduced into the vessel. After a suitable reaction time, the valve 8 in the output line of the reaction vessel is opened and the slurry is delivered by pump 9 into the vacuum drum filter 10 wherein the precipitate consisting essentially of hydroxides is separated from the remaining $MgCl_2$ solution. The solid precipitate forms a filter cake which is removed through line 11.

The purified magnesium chloride solution is delivered into the receptacle 12 connected to the filter 10, this solution still containing $CaCl_2$ and $MgSO_4$, whence the solution is delivered into a group of the battery of tanks 13. The solution is kept in these tanks at a temperature of about 50°C. at a pH of 1 to 4 to precipitate the remainder of the calcium oxide in the form of plaster of Paris and is then delivered by pump 9 through valved line 14 back into the filter 10 where the plaster of Paris precipitate is separated from the solution, the purified solution being delivered into another group of the battery of tanks 13 where it is collected.

From the latter group of collecting tanks, the purified magnesium chloride solution is delivered by pump 15 to a known type of a thermal decomposition plant which includes a recuperator 16 for concentrating the solution, a pump 17 for removing the concentrated solution from the recuperator, and a decomposition furnace 18 to which the pump delivers the concentrated magnesium chloride solution. Pyrolysis in the furnace converts the solution into solid magnesia which is removed from the furnace at 19 in the form of active caustic magnesia.

The hot HCl-gas freed during the decomposition in furnace 18 is delivered with water vapor and the furnace waste gases through line 20 into cyclone 21. Any solid MgO delivered into the cyclone with the gases is separated there and returned into the furnace through line 22 while the hot gas mixture is delivered through line 23 into heat exchanger 16 where its heat is used to concentrate the purified solution delivered into the heat exchanger by pump 15. The cooled gas mixture passes through line 24 into absorption column 25 which receives water or diluted hydrochloric acid through inlet pipe 26. Waste vapors and gases, which consist of a mixture of water vapor, carbon dioxide and waste air, are removed through flue 28 by ventilator 27. The absorption column 25 is adiabatically operated and produces 20% hydrochloric acid which is delivered to storage tank 6 by pump 30.

The waste gases emanating from reaction vessel 1 are freed of harmful components, such as corrosive HCl-vapors, by scrubber 31, whereupon the harmless waste gases are removed, preferably through the flue 28. The same holds true for the waste gases coming from receptacle 12.

As previously indicated, the apparatus used in the thermal decomposition plant is known. For instance, a furnace 18 with associated cyclone 21, recuperator-heat exchanger 16 and absorption column 25, such as illustrated herein, has been used in installations for pickling sheet metal with hydrochloric acid. In this known apparatus, iron oxide is removed from the furnace instead of magnesia, as herein.

The process of the present invention may be advantageously used with any magnesitic waste material, particularly magnesite dusts of all kinds. A useful starting material is, for instance, the dust separated from the waste gases produced in calcining magnesite. Such particulate mineral materials may have various compositions, most of them being impure magnesia and magnesium carbonate mixtures which may contain sintered as well as caustically burnt or raw carbonate. Such materials usually have glow losses up to about 30%.

Such magnesite dusts may be dissolved readily in hydrochloric acid without supplying heat to the reaction. The dust may be introduced into the acid or the acid may be sprayed over the dust, the introduction of the dust into the acid being preferred because the other method may lead to the formation of sorel cement. The dissolution of MgO in HCl is exothermic. Increased acid concentration results in increased concentrations of the resultant $MgCl_2$ solution and increased boiling points. Since the magnesite dust usually contains $MgCO_3$, in addition to MgO, carbon dioxide is also produced, and escapes.

With caustically burnt magnesite as a starting material the reaction conditions are similar, except that the higher content of MgO in the starting material causes a more strongly exothermic reaction, and no $CO_2$ escapes because of the absence of $MgCO_3$.

Sinter magnesia produces a reaction similar to that of caustically burnt magnesite but the reaction is slower. If cold HCl is used, the temperature rises relatively slowly and the reaction is rather slow. As soon as a temperature of 70°C. has been reached, however, the reaction proceeds as with caustically burnt magnesite. If the reaction is not controlled, i.e. if an excess of sinter is introduced into cold hydrochloric acid, the process may become rather violent above 70°C. because the excess sinter, which has not been dissolved up to that point, reacts suddenly. Therefore, it is desirable to start with an acid having a minimum temperature of 70°C.

Native magnesium carbonate is dissolved in an industrially tolerable period of time only if heat is constantly supplied to the reaction, producing, of course, a great deal of $CO_2$. If cold hydrochloric acid is added, the reaction mixture does not increase its temperature noticeably and hardly any reaction occurs. As in the case of the magnesite dust coming from the calcining of magnesite, mixtures of up to 50% magnesium carbonate and the remainder caustically burnt or sintered magnesia will dissolve in HCl without supplying external heat to the reaction since the reaction of HCl with MgO is exothermic and thus produces enough heat to dissolve the carbonate, too, the temperature of the reaction mixture rising above 70°C.

The reaction mixture finally forms an acidic magnesium chloride solution containing dissolved (Fe, Al, Cr, Mn, B) or suspended ($SiO_2$, $TiO_2$) impurities. When the solution is neutralized or made slightly alkaline, i.e.

when it reaches a pH of about 4 to 9, the iron, aluminum, chromium and manganese impurities, which are present in the form of oxides, are converted into hydroxides by hydrolysis, in which form these impurities are precipitated from the solution. Silica and titania, as far as they have been colloidally dissolved, are carried along with the hydroxide precipitates. The $B_2O_3$ impurity is adsorbed by the hydroxides and thus also taken along with the precipitates out of the solution.

To make this latter removal of silica, titania and boron oxide possible, it is necessary that the sum total of the oxides which precipitate as hydroxides is sufficient to carry along the sum total of the colloidally dissolvable or adsorbable impurities. This is accomplished according to this invention by keeping these totals in the above-indicated ratio of at least 1 : 3, it being preferred that the weight of the four precipitable oxides exceed the weight of the three other oxides.

Since sodium and potassium largely remain in the solution, magnesia of the desired purity may be obtained only if the starting material is correspondingly poor in these two metals (or their derivatives).

The precipitant may be any neutralizing agent. However, if alkali compounds are used for this purpose, the resultant product will contain alkali impurities. If ammonium compounds are used, the resultant ammonia waste gases may constitute a handling problem. It is, therefore, proposed to use impure magnesium and/or calcium containing substances as precipitant for the impurities, such substances being preferably used in the form of oxides or hydroxides. Therefore, the precipitants, i.e. the neutralizing agents for the magnesium chloride solution, may be the same substances as the starting materials themselves, for instance magnesite dust, caustically burnt magnesite, sinter magnesia, magnesium hydroxide, etc. Magnesium carbonate alone reacts too slowly to be a useful precipitant but it may be present therein up to about 50%.

As far as the manganese oxide impurity is concerned, it should be noted that it will be precipitated as manganese hydroxide in the indicated pH range only in its tetravalent form. To remove the divalent manganese, too, the dissolved $Mn^{++}$-ions are converted according to one embodiment of the invention to the tetravalent form by introducing an oxidizing agent, such as elemental chlorine, into the reaction mixture, either before or during the precipitation of the hydroxides. This will remove the Mn-impurities to a large extent above a pH of 5.

Depending on the starting material and the precipitant, different amounts of precipitant are required. With caustic magnesia as a starting material, the precipitations are practically in stoichiometric ratios and the yield of MgO is almost 100%. The excess amounts of precipitant needed with magnesite dust, on the other hand, are linearly dependent on the carbonate content of the dust. At any rate, with the above-described group of starting materials, the MgO yield is between about 85% and 99%.

In the industrial operation, an excess of precipitant and/or starting material, which does not go into solution, is desirable because this excess unexpectedly has been found to aid in filtering the precipitates from the mother liquor and thus considerably facilitates the filtering process. For instance, conventional vacuum drum filters work very efficiently, leaving a very clear filtrate.

It should further be noted that the iron impurities may be present in di- and trivalent form. In caustic magnesia and sinter magnesia, iron impurities are primarily trivalent while they are divalent in magnesium carbonate. Trivalent iron will precipitate at a pH of only 3 or 4 while divalent iron will not precipitate until a pH of 6 or 7 has been reached. Furthermore, the hydroxides of trivalent iron flocculate better and, therefore, may be more readily filtered than those of divalent iron. In practical operations, however, complete precipitation and separation of the precipitate will not be hindered by the presence of some divalent iron hydroxide if an excess of precipitant is used.

In the illustrated installation, the starting material and the hydrochloric acid solvent are introduced into the reaction vessel 1 separately, and the solution and precipitation stages are successive. However, it is also possible to introduce the starting material, preferably in dust or powder form, and the hydrochloric acid together into the reaction vessel. In this case, solution and precipitation proceed simultaneously since the starting material functions also as precipitant.

After the precipitates have been separated from the magnesium chloride solution, which is preferably done by filtering, the solution contains only calcium as impurity. This may be removed by precipitation in the form of calcium sulfate (plaster of paris) or calcium carbonate, or by washing the calcium chloride out of the end product.

Precipitation of the calcium values in the form of the sulfate may be effected with any water-soluble $SO_4$-compound but, in commercial operations, sulfuric acid or magnesium sulfate will be used. The preferred precipitant is pure solid magnesium sulfate hydrate, $MgSO_4 \cdot H_2O$, for instance kieserite, or Epsom salt because this provides a magnesium-calcium exchange, thus increasing the yield of MgO. Precipitation may be effected by adding the precipitant in stoichiometric ratio, or a slight excess thereover, to the purified $MgCl_2$-solution to precipitate the $Ca^{++}$-ions as calcium sulfate. More effective removal of the calcium values will be achieved if the solution is held in a reaction vessel at a temperature of 20°C. to 70°C., preferably about 50°C., and a pH of 1 to 8, preferably 1 to 4, for several hours, for instance 2 to 6 hours, preferably about 3 hours, to permit the $SO_4$-containing precipitant to react fully with the calcium ions in the solution, the resultant magnesium sulfate precipitant being separated from the solution before it is thermally decomposed. The solution is cooled to a temperature of about 50°C. because the solubility of plaster of paris in the $MgCl_2$-solution is at a minimum at this temperature. The indicated pH range of the reaction mixture may be obtained by adding a small amount of the hydrochloric acid which is cycled through the installation. This acidification makes the precipitated plaster of paris crystals more easily filterable, which increases the speed of the precipitation and separation of the calcium ions.

However, the magnesium sulfate precipitation may also be effected before the other impurities have been removed, i.e. the $SO_4$-containing precipitant may be added at the time the starting material is dissolved in the hydrochloric acid, beng added to the starting material or to the acid at the beginning of the process. In this case, the major portion of the calcium sulfate is precipitated at the same time as the hydroxides of other impurities, and is separated from the solution simultaneously therewith, while the residue of the calcium values are later removed in a separate reaction vessel under the above-described conditions before the purified solution is thermally decomposed.

If the calcium ions are to be precipitated in the form of calcium carbonate, the solution is treated in a known manner with carbon dioxide, which may be derived from the waste gases of calcining furnaces or kilns used for other manufacturing operations in the plant. In the presence of MgO, which may be derived from an excess of starting material, this reaction proceeds according to the equations $$MgO + H_2O \rightarrow Mg(OH)_2$$

$$Mg(OH)_2 + CaCl_2 + CO_2 \rightarrow CaCO_3 + MgCl_2 + H_2O$$

In the thermal decomposition of the $MgCl_2$-solution at the previously indicated temperatures, the magnesium chloride is only pyrolytically decomposed while calcium chloride remains substantially intact at the operating temperatures below 900°C., being removed from the installation together with the magnesia. Since $CaCl_2$ is highly soluble in water while MgO is water-insoluble, the calcium chloride may be selectively washed out of the product, preferably with slightly acidic water, to obtain a very pure end product, after filtration. MgO reacts with the wash water to form $Mg(OH)_2$ and, after washing, this forms a filter cake containing about 30 –0 40% water. The recovery of MgO by drying the filter cake and decomposing the magnesium hydroxide requires increased temperatures. The calcium chloride, on the other hand, is produced in a dilute solution and, to prevent loss of chlorine values in the total process, they are preferably recycled. This can be accomplished if the calcium chloride is reacted with kieserite to produce $MgCl_2$ and plaster of paris. It may also be possible to recover $CaCl_2$ itself and to obviate chlorine losses in the recycling process by adding hydrochloric acid or magnesium chloride.

We claim:
1. An industrial process of preparing magnesia containing more than 98% MgO and less than 0.1% each of the oxides of Fe, Al, Cr, Mn, Si, Ti, Na, K, and B, all percentage values being by weight, which comprises:
   1. dissolving a starting material at a first temperature of more than 70° in an amount of aqueous hydrochloric acid sufficient to produce an acidic solution,
      a. said starting material essentially consisting of magnesium carbonate, magnesium oxide, magnesium hydroxide, or mixtures thereof, and containing, as impurities, at least one compound of members of a first group consisting of iron, aluminum, chromium, and manganese, and at least one compound of members of a second group consisting of silicon, titanium, and boron,
      b. the starting material being treated until the ratio in said solution of the combined weight of the compounds of said first group, calculated as $Fe_2O_3+Al_2O_3+Cr_2O_3+Mn_3O+_4$ to the combined weight of the compounds of said second group, calculated as $SiO_2+TiO_2+B_2O_3$, is changed to at least 1 : 3, and
      c. the concentration of said hydrochloric acid being 15% to 32% by weight,
   2. adding to said acidic solution a magnesium or calcium compound sufficiently alkaline to raise the pH of said solution to the range of 4 to 9 and to substantially completely precipitate the compounds of members of said first group as hydroxides, the compounds of members of said second group being coprecipitated therewith;
   3. separating the precipitate from the residual purified magnesium chloride solution;
   4. heating said solution to a second temperature between about 400°C and 900°C, whereby the magnesium chloride therein is decomposed in the presence of water to magnesia and gaseous hydrochloric acid;
   5. recovering said magnesia;
   6. converting said gaseous hydrochloric acid to aqueous hydrochloric acid having said concentration of 15% to 32% by weight, and
   7. dissolving an additional amount of said starting material in said last mentioned aqueous hydrochloric acid.

2. The industrial process of claim 1, wherein the starting material is treated until weight ratio of said $Fe_2O_3+Al_2O_3+Cr_2O_3+Mn_3O_4$ to said $SiO_2+TiO_2+B_2O_3$ is greater than 1 : 1.

3. The industrial process of claim 1, wherein said concentration is 18 to 22%, by weight.

4. The industrial process of claim 1, wherein said raised pH is 6 to 8.

5. The industrial process of claim 3, wherein said second temperature is about 550°C to 750°C.

6. The industrial process of claim 3, wherein the starting material is particulate and has a grain size below 3 mm.

7. The industrial process of claim 3, wherein the alkaline compound is an oxide or hydroxide.

8. The industrial process of claim 1, wherein said acidic solution contains divalent manganese as an impurity, and an oxidizing agent is added to said solution no later than during the adding of said alkaline compound in an amount sufficient to convert said divalent manganese to tetravalent manganese.

9. The industrial process of claim 8, wherein the oxidizing agent is elemental chlorine.

10. The industrial process of claim 1, wherein the starting material is a magnesite waste material.

11. The industrial process of claim 1, wherein said purified magnesium chloride solution contains calcium ions, and solid, pure magnesium sulfate is added to said magnesium chloride solution at a temperature between about 20° and 70°C and at a pH of 1 to 4 in an amount sufficient to substantially completely precipitate said calcium ions as calcium sulfate.

12. The industrial process of claim 1, wherein said purified magnesium chloride solution contains calcium ions whereby the recovered magnesium oxide contains calcium chloride, and leaching said calcium chloride from said recovered magnesium oxide with water.

* * * * *